(No Model.)

J. B. LOW.
GALVANIC BATTERY.

No. 324,858. Patented Aug. 25, 1885.

Witnesses:
S. B. Brewer,
Chas. F. Scattergood

Inventor:
Jesse B. Low,
by William N. Low,
Attorney.

UNITED STATES PATENT OFFICE.

JESSE B. LOW, OF WATERTOWN, NEW YORK.

GALVANIC BATTERY.

SPECIFICATION forming part of Letters Patent No. 324,858, dated August 25, 1885.

Application filed March 28, 1885. (No model.)

*To all whom it may concern:*

Be it known that I, JESSE B. LOW, of Watertown, in the county of Jefferson and State of New York, have invented a new and useful Improvement in Galvanic Batteries, of which the following is a specification.

The object of my invention is to provide a simple, cheap, effective, and enduring battery for open-circuit lines; and to this end my invention consists of a battery composed of an outer glass jar containing an unglazed earthenware porous cup, a carbon porous cup fixed inside of the earthen porous cup, which carbon cup also serves as the positive electrode of the battery, and a negative electrode of zinc or other suitable material.

Figure 1:
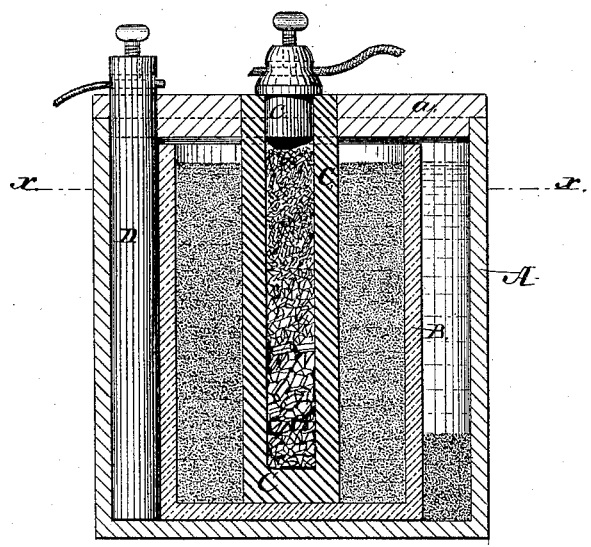
Figure 2:
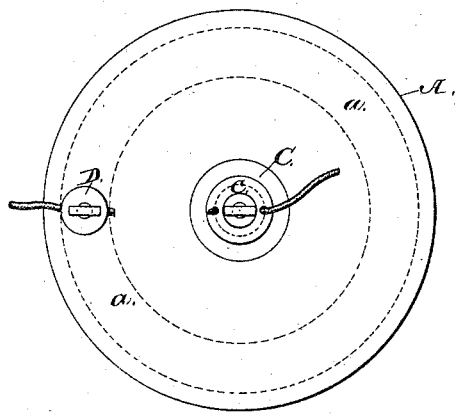
Figure 3:
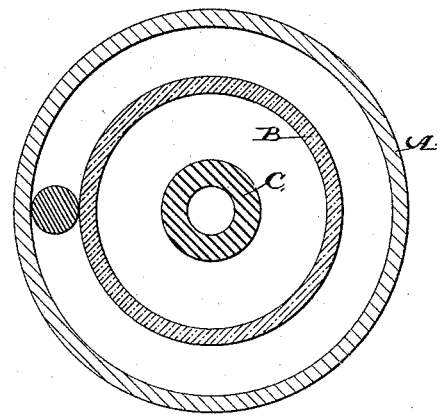

In the accompanying drawings, which—being herein referred to—form part of this specification, Figure 1 is a vertical section of my battery, Fig. 2 a plan view of the same, and Fig. 3 a horizontal section of same at the line $x$ $x$.

As shown in the drawings, A is the outer jar, which is made of glass, preferably in cylindrical form, and with an open top. Said jar is provided with a cover, $a$, preferably made of glass, and adapted to close over the open top of the jar.

B is an earthen porous cup, made in form corresponding to that of the jar A, but of smaller diameter and less height than said jar. Said porous cup is fixed inside of the jar A beneath the cover $a$, and rests on the bottom of the said jar.

C is a carbon porous cup fixed inside of the earthen porous cup, and resting on the bottom of the same. Said carbon cup extends upward through a central hole in the cover $a$, and its outer end is provided with a stopper, $c$, preferably made of carbon capped with lead, which seals the top of said cup, so as to prevent the admission of air thereinto, and which forms a binding-post to which one of the circuit-wires is connected.

D is the negative electrode, which is preferably made of a cylindrical bar of zinc. Said electrode rests upon the bottom of the jar and extends upward through the cover $a$. The upper end of said electrode is adapted to be connected to one of the circuit-wires in the usual manner.

The carbon porous cup C is filled with commercial chromic acid and sealed with the stopper $c$, so as to exclude the air therefrom. Said carbon cup is then placed centrally in the earthen porous cup B, and the annular space between the two is filled up to the top of the cup B with chloride of sodium, (common salt.) The two porous cups are then placed centrally in the outer jar, A, and the annular space between said jar and the porous cup B is filled to about one-third of its depth with chloride of sodium. The last-named annular space is then filled with water, and after the cover $a$ is fixed over the jar A the electrode D is inserted in place and pushed down until it rests on the bottom of the jar, or until it is well inserted in the chloride of sodium.

The chemical action of this battery to generate electricity is as follows: The sodium chloride acts on the zinc, producing a double salt of sodium and zinc chloride and liberating hydrogen. The latter passing through or into the earthen porous cup reduces the chromic acid to brown chromium oxide, with the formation of water and the liberation of a small amount of chlorine.

By sealing the carbon porous cup C the chromic acid is prevented from deteriorating by exposure to the atmosphere and rays of light, and retards an undue percolation of the acid solution through the body of the carbon cup.

I claim as my invention—

1. A galvanic battery composed of an outer jar, an unglazed earthenware porous cup and a carbon porous cup, the space between the outer jar and the earthen porous cup containing a solution of chloride of sodium, and a negative electrode, the space between the earthenware porous cup and the carbon porous cup being packed with chloride of sodium, and the carbon porous cup containing chromic acid, all being arranged relatively in the manner herein specified.

2. A carbon porous cup adapted to contain an acid and provided with a removable stopper for hermetically sealing said cup, the said stopper forming a binding-post for receiving one of the circuit-wires, as herein specified.

JESSE B. LOW.

Witnesses:
WM. H. LOW,
S. B. BREWER.